US006657935B2

United States Patent
Eguchi et al.

(10) Patent No.: US 6,657,935 B2
(45) Date of Patent: Dec. 2, 2003

(54) METHOD AND APPARATUS FOR RECORDING INFORMATION ON RECORDING MEDIUM

(75) Inventors: Hideharu Eguchi, Yokosuka (JP); Yasuhiro Ueki, Sagamihara (JP); Osamu Yanagisawa, Chiba (JP); Yutaka Osada, Fujisawa (JP); Kenji Koishi, Sanda (JP); Makoto Usui, Osaka (JP); Kohjyu Konno, Takatsuki (JP); Yuuichi Kamioka, Katano (JP)

(73) Assignees: Victor Company of Japan, Ltd., Yokohama (JP); Matsushita Electric Industrial Co., LTD, Osaka (JP)

( * ) Notice: Subject to any disclaimer, the term of this patent is extended or adjusted under 35 U.S.C. 154(b) by 228 days.

(21) Appl. No.: 09/944,120

(22) Filed: Sep. 4, 2001

(65) Prior Publication Data

US 2002/0036961 A1 Mar. 28, 2002

(30) Foreign Application Priority Data

Sep. 28, 2000 (JP) ........................................ 2000-295734

(51) Int. Cl.$^7$ ................................................. G11B 7/00
(52) U.S. Cl. ................... 369/59.1; 369/59.12; 369/116; 369/47.51
(58) Field of Search ................................. 369/47.1, 47.5, 369/47.51, 53.1, 59.1, 59.11, 59.12, 59.13, 116

(56) References Cited

U.S. PATENT DOCUMENTS 4,866,688 A * 9/1989 Ohtake et al. ........... 369/44.13
5,808,988 A * 9/1998 Maeda et al. ............ 369/47.17

FOREIGN PATENT DOCUMENTS

JP    11-312311    11/1999

* cited by examiner

Primary Examiner—Muhammad Edun
(74) Attorney, Agent, or Firm—Louis Woo

(57) ABSTRACT

Multi-pulse trains of a forward laser beam are applied to an optical disc to record mark areas thereon. The multi-pulse trains correspond to the mark areas respectively. The multi-pulse trains represent information to be recorded. Detection is made as to an intensity of a reflected laser beam which results from reflection of the forward laser beam by the optical disc. The detected intensity is divided by a setting intensity to get a division result. A condition of recording of each of the mark areas is detected in response to the division result. An amplitude of each of the multi-pulse trains is controlled in response to the detected condition.

20 Claims, 11 Drawing Sheets

METHOD AND APPARATUS FOR RECORDING INFORMATION ON RECORDING MEDIUM

BACKGROUND OF THE INVENTION

1. Field of the Invention

This invention relates to a method of recording information on an optical disc by using a laser beam. This invention also relates to an apparatus for recording information on an optical disc by using a laser beam.

2. Description of the Related Art

It is known to record information on an optical disc in a mark edge recording technique (a mark length recording technique). An example of the recording of information on an optical disc uses a laser beam. Specifically, during the recording of information, a laser beam is intermittently applied to the optical disc while being moved relative thereto. Recording marks are formed in places on the optical disc which are exposed to the laser beam.

In general, the laser beam is generated by a laser diode. To implement the intermittent generation of the laser beam, the laser diode is driven by a pulse signal. In a conventional method, every recording mark on the optical disc corresponds to one drive pulse fed to the laser diode. Furthermore, the length of the recording mark corresponds to the width of the drive pulse. In this case, the heat accumulation effect causes positional and shape errors of the edges of the recording mark.

In a known improved method, every recording mark on an optical disc is caused by a multi-pulse train fed to a laser diode. The multi-pulse train means a sequence of short drive pulses. The duty cycle of the multi-pulse train is chosen to provide a suitable effective recording power of the laser beam at which the heat accumulation effect is sufficiently suppressed. Generally, the width of a first drive pulse in the multi-pulse train is greater than those of other drive pulses therein.

Japanese patent application publication number 11-312311 discloses a method of recording information on an optical disc. In the method of Japanese application 11-312311, a mark data length "nT" is determined on the basis of the period "T" of a recording channel clock signal, where "n" denotes an integer selected from predetermined natural numbers. For the mark data length "nT", a multi-pulse train is fed to a laser diode to form a recording mark on the optical disc. The multi-pulse train means a sequence of short drive pulses. One of drive pulses in the multi-pulse train is remarkably longer than the other drive pulses. Specifically, the long drive pulse has a width equal to or greater than "1.5T" while the other drive pulses are equal to or shorter than about "T". In the method of Japanese application 11-312311, a photodiode detects the intensity of a reflected laser beam which results from the reflection of a forward laser beam by the optical disc. During the application of the long drive pulse to the laser diode, the laser beam intensity detected by the photodiode rises and then drops before stabilizing. The detected laser beam is sampled at a moment within the stabilizing stage during the application of the long drive pulse. The sample of the detected laser beam indicates a mark forming condition. Samples of the detected laser beam are generated for multi-pulse trains, respectively. A drive signal to the laser diode which contains multi-pulse trains is controlled in response to samples of the detected laser beam to maintain the mark recording condition in an appropriate range.

SUMMARY OF THE INVENTION

It is a first object of this invention to provide an improved method of recording information on a recording medium such as an optical disc.

It is a second object of this invention to provide an improved apparatus for recording information on a recording medium such as an optical disc.

A first aspect of this invention provides a method of recording information on an optical disc. The method comprises the steps of applying multi-pulse trains of a forward laser beam to the optical disc to record mark areas thereon, the multi-pulse trains corresponding to the mark areas respectively; detecting an intensity of a reflected laser beam which results from reflection of the forward laser beam by the optical disc; dividing the detected intensity by a setting intensity to get a division result; detecting a condition of recording of each of the mark areas in response to the division result; and controlling an amplitude of each of the multi-pulse trains in response to the detected condition.

A second aspect of this invention provides a method of recording information on an optical disc. The method comprises the steps of applying multi-pulse trains of a forward laser beam to the optical disc to record mark areas thereon, the multi-pulse trains corresponding to the mark areas respectively; detecting an intensity of a reflected laser beam which results from reflection of the forward laser beam by the optical disc; detecting a maximal intensity of the reflected laser beam which is caused by first one among pulses in each of the multi-pulse trains; dividing the detected intensity by the detected maximal intensity to get a division result; detecting a condition of recording of each of the mark areas in response to the division result; and controlling an amplitude of each of the multi-pulse trains in response to the detected condition.

A third aspect of this invention is based on the first aspect thereof, and provides a method wherein the detected intensity comprises a detected mean intensity of the reflected laser beam which corresponds to a post-head time portion of each of the multi-pulse trains.

A fourth aspect of this invention is based on the first aspect thereof, and provides a method wherein the detected intensity comprises a difference between a detected mean intensity of the reflected laser beam which corresponds to a post-head time portion of each of the multi-pulse trains and a detected intensity of the reflected laser beam which corresponds to each of intervals between the multi-pulse trains.

A fifth aspect of this invention is based on the first aspect thereof, and provides a method wherein the detected intensity comprises a ratio between a detected mean intensity of the reflected laser beam which corresponds to a post-head time portion of each of the multi-pulse trains and a detected intensity of the reflected laser beam which corresponds to each of intervals between the multi-pulse trains.

A sixth aspect of this invention is based on the first aspect thereof, and provides a method wherein the detected intensity comprises one of (1) a difference and (2) a ratio between a detected mean intensity of the reflected laser beam which corresponds to a post-head time portion of each of the multi-pulse trains and a detected intensity of the reflected laser beam which corresponds to each of intervals between the multi-pulse trains.

A seventh aspect of this invention is based on the first aspect thereof, and provides a method further comprising the step of controlling a duty cycle of each of the multi-pulse trains in response to the detected condition in cases where the amplitude thereof reaches its upper limit.

An eighth aspect of this invention is based on the third aspect thereof, and provides a method wherein the detected mean intensity consists of a detected mean intensity of the reflected laser beam which corresponds to a post-head time portion of each of selected ones among the multi-pulse trains, and the selected multi-pulse trains correspond to mark data lengths between 7T and 14T, where "T" denotes a channel period.

A ninth aspect of this invention is based on the third aspect thereof, and provides a method wherein the detected mean intensity consists of a detected mean intensity of the reflected laser beam which corresponds to a post-head time portion of each of selected ones among the multi-pulse trains, and the selected multi-pulse trains correspond to a maximum mark data length.

A tenth aspect of this invention is based on the third aspect thereof, and provides a method wherein the detected mean intensity consists of a detected mean intensity of the reflected laser beam which corresponds to a post-head time portion of each of selected ones among the multi-pulse trains, and the selected multi-pulse trains correspond to a mark data length of nT being a later run length, where "T" denotes a channel period and "n" denotes a predetermined natural number.

An eleventh aspect of this invention is based on the third aspect thereof, and provides a method wherein the detected mean intensity comprises a detected mean intensity based on at least two detected mean intensities corresponding to two of the multi-pulse trains.

A twelfth aspect of this invention is based on the third aspect thereof, and provides a method wherein the detected mean intensity comprises a detected mean intensity based on at least two detected mean intensities corresponding to a common angular position on the optical disc.

A thirteenth aspect of this invention is based on the third aspect thereof, and provides a method further comprising the step of using a filter to get the detected mean intensity, the filter attenuating a signal component having a frequency equal to a frequency of the multi-pulse trains by at least 30 dB.

A fourteenth aspect of this invention is based on the first aspect thereof, and provides a method wherein the detected intensity comprises a detected mean intensity of the reflected laser beam which corresponds to a time point in a later half time portion of each of the multi-pulse trains.

A fifteenth aspect of this invention is based on the first aspect thereof, and provides a method wherein the detected intensity comprises a detected mean intensity of the reflected laser beam which corresponds to pulses except a first pulse in each of the multi-pulse trains.

A sixteenth aspect of this invention provides an apparatus for recording information on an optical disc. The apparatus comprises first means for applying multi-pulse trains of a forward laser beam to the optical disc to record mark areas thereon, the multi-pulse trains corresponding to the mark areas respectively; a photosensitive element receiving a reflected laser beam which results from reflection of the forward laser beam by the optical disc, the photosensitive element generating a current depending on an intensity of the reflected laser beam; second means for converting the current generated by the photosensitive element into a voltage; a low pass filter receiving the voltage generated by the second means for attenuating a component of the voltage which has a frequency equal to a frequency of the multi-pulse trains; a sample-and-hold circuit for detecting, on the basis of an output signal from the low pass filter, a mean intensity of the reflected laser beam which corresponds to each of the multi-pulse trains; third means for dividing one of (1) the detected mean intensity, (2) a difference between the detected mean intensity and a detected intensity of the reflected laser beam which corresponds to each of intervals between the multi-pulse trains, and (3) a ratio between the detected mean intensity and a detected intensity of the reflected laser beam which corresponds to each of intervals between the multi-pulse trains by a setting intensity to generate a division result; and fourth means for detecting a condition of recording of each of the mark areas in response to the division result generated by the third means.

A seventeenth aspect of this invention provides an apparatus for recording information on an optical disc. The apparatus comprises first means for applying multi-pulse trains of a forward laser beam to the optical disc to record mark areas thereon, the multi-pulse trains corresponding to the mark areas respectively; a photosensitive element receiving a reflected laser beam which results from reflection of the forward laser beam by the optical disc, the photosensitive element generating a current depending on an intensity of the reflected laser beam; second means for converting the current generated by the photosensitive element into a voltage; third means for detecting, on the basis of the voltage generated by the second means, a maximal intensity of the reflected laser beam which is caused by first one among pulses in each of the multi-pulse trains; a low pass filter receiving the voltage generated by the second means for attenuating a component of the voltage which has a frequency equal to a frequency of the multi-pulse trains; a sample-and-hold circuit for detecting, on the basis of an output signal from the low pass filter, a mean intensity of the reflected laser beam which corresponds to each of the multi-pulse trains; fourth means for dividing one of (1) the detected mean intensity, (2) a difference between the detected mean intensity and a detected intensity of the reflected laser beam which corresponds to each of intervals between the multi-pulse trains, and (3) a ratio between the detected mean intensity and a detected intensity of the reflected laser beam which corresponds to each of intervals between the multi-pulse trains by the maximal intensity detected by the third means to generate a division result; and fifth means for detecting a condition of recording of each of the mark areas in response to the division result generated by the fourth means.

An eighteenth aspect of this invention provides an apparatus for recording information on an optical disc. The apparatus comprises first means for applying multi-pulse trains of a forward laser beam to the optical disc to record mark areas thereon, the multi-pulse trains corresponding to the mark areas respectively; a photosensitive element receiving a reflected laser beam which results from reflection of the forward laser beam by the optical disc, the photosensitive element generating a current depending on an intensity of the reflected laser beam; second means for converting the current generated by the photosensitive element into a voltage; a first sample-and-hold circuit for detecting, on the basis of the voltage generated by the second means, an intensity of the reflected laser beam which corresponds to each of the multi-pulse trains; a low pass filter receiving the voltage generated by the second means for attenuating a component of the voltage which has a frequency equal to a frequency of the multi-pulse trains; a second sample-and-hold circuit for detecting, on the basis of an output signal from the low pass filter, a mean intensity of the reflected laser beam which corresponds to each of the multi-pulse trains; third means for dividing one of (1) the detected mean intensity, (2) a difference between the detected mean intensity and a detected intensity of the reflected laser beam which corresponds to each of intervals between the multi-pulse trains, and (3) a ratio between the detected mean intensity and a detected intensity of the reflected laser beam which corresponds to each of intervals between the multi-pulse trains by the intensity detected by the first sample-and-hold circuit to generate a division result; and fourth means for detecting a condition of recording of each of the mark areas in response to the division result generated by the third means.

A nineteenth aspect of this invention provides an apparatus for recording information on an optical disc. The apparatus comprises first means for applying multi-pulse trains of a forward laser beam to the optical disc; second means for detecting an intensity of a reflected laser beam which results from reflection of the forward laser beam by the optical disc; third means for generating a mean of the intensity detected by the second means, the mean corresponding to each of the multi-pulse trains; and fourth means for controlling an amplitude of each of the multi-pulse trains in response to the mean generated by the third means.

A twentieth aspect of this invention provides an apparatus for recording information on an optical disc. The apparatus comprises first means for applying multi-pulse trains of a forward laser beam to the optical disc; second means for detecting an intensity of a reflected laser beam which results from reflection of the forward laser beam by the optical disc; third means for generating a mean of the intensity detected by the second means, the mean corresponding to each of the multi-pulse trains; fourth means for sampling the intensity detected by the second means to generate a first intensity sample corresponding to a maximal intensity of the reflected laser beam which is caused by first one among pulses in each of the multi-pulse trains; fifth means for sampling the intensity detected by the second means to generate a second intensity sample representing an intensity of the reflected laser beam which corresponds to each of intervals between the multi-pulse trains; and sixth means for controlling an amplitude of each of the multi-pulse trains in response to the mean generated by the third means, the first intensity sample generated by the fourth means, and the second intensity sample generated by the fifth means.

DETAILED DESCRIPTION OF THE INVENTION

First Embodiment

Figure 1:
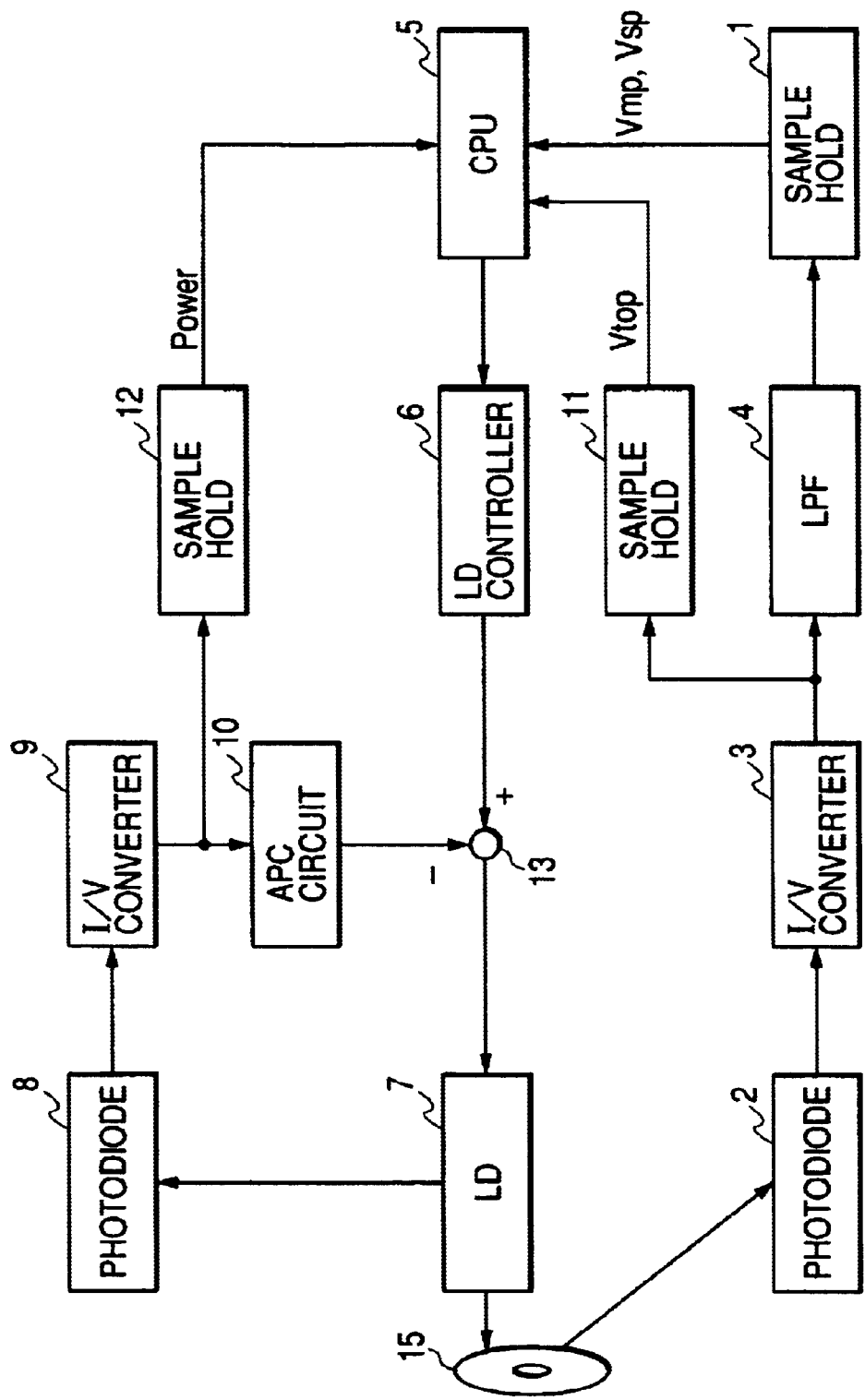
FIG. 1 is a block diagram of an information recording apparatus according to a first embodiment of this invention.

FIG. 1 shows an information recording apparatus according to a first embodiment of this invention. The apparatus of FIG. 1 includes a sample-and-hold circuit 1, a photodiode (PD) 2, a current-to-voltage converter (an I/V converter) 3, a low pass filter (LPF) 4, a CPU 5, an LD controller 6, a laser diode (LD) 7, a photodiode (PD) 8, a current-to-voltage converter (an I/V converter) 9, an automatic power control (APC) circuit 10, sample-and-hold circuits 11 and 12, and a differential amplifier 13.

The photodiode 2 is electrically connected with the I/V converter 3. The I/V converter 3 is followed by the LPF 4 and the sample-and-hold circuit 11. The LPF 4 is followed by the sample-and-hold circuit 1. The sample-and-hold circuits 1 and 11 are connected with the CPU 5. The CPU 5 is connected with the LD controller 6. The LD controller 6 is connected with the differential amplifier 13. The differential amplifier 13 is connected with the laser diode 7. The photodiode 8 is optically coupled with the laser diode 7. The photodiode 8 is electrically connected with the I/V converter 9. The I/V converter 9 is followed by the APC circuit 10 and the sample-and-hold circuit 12. The APC circuit 10 is connected with the differential amplifier 13. The sample-and-hold circuit 12 is connected with the CPU 5.

The laser diode 7 emits a forward laser beam which is applied to an optical disc 15. The forward laser beam is modulated in accordance with information to be recorded. Specifically, the laser diode 7 is driven by multi-pulse trains representing the information to be recorded. Therefore, the laser diode 7 emits corresponding multi-pulse trains of the forward laser beam. The optical disc 15 is rotated by a suitable drive device (not shown) such as a spindle motor. During the rotation, the optical disc 15 is scanned by the forward laser beam so that the information is recorded or written thereon. Specifically, recording marks (mark areas) representing the information are formed on the optical disc 15. The recording marks correspond to the multi-pulse trains, respectively. The forward laser beam is at least partially reflected by the optical disc 15, traveling back as a reflected laser beam. The reflection of the forward laser beam by the optical disc 15 depends on conditions of the formation of every recording mark. The photodiode 2 is exposed to a portion of the reflected laser beam. The photodiode 2 detects the intensity of the reflected laser beam (specifically, the intensity of the portion of the reflected laser beam), and generates a current signal representing the detected intensity. The photodiode 2 outputs the current signal to the I/V converter 3.

The I/V converter 3 changes the current signal into a corresponding voltage signal. The voltage signal generated by the I/V converter 3 represents the detected intensity of the reflected laser beam. Specifically, the level of the voltage signal rises as the detected intensity increases. The I/V converter 3 outputs the voltage signal to the LPF 4 and the sample-and-hold circuit 11.

The LPF 4 subjects the output signal of the I/V converter 3 to a band limiting process, that is, a low pass filtering process which corresponds to signal-voltage averaging or smoothing process. The LPF 4 generates the filtering-resultant signal which represents a mean of the detected intensity of the reflected laser beam. The LPF 4 outputs the filtering-resultant signal to the sample-and-hold circuit 1.

A suitable pulse generator (not shown) produces a first sampling pulse and a second sampling pulse in response to the end of every multi-pulse train. The first sampling pulse precedes the end of the multi-pulse train by a first predetermined time interval. The second sampling pulse follows the end of the multi-pulse train by a second predetermined time interval. The sample-and-hold circuit 1 receives every first sampling pulse and every second sampling pulse from the pulse generator. The sample-and-hold circuit 1 samples the output signal of the LPF 4 in response to every first sampling pulse, and then holds the resultant sample of the output signal of the LPF 4. The sample-and-hold circuit 1 outputs the held signal sample to the CPU 5. The signal sample corresponding to the first sampling pulse represents a mean value Vmp of the detected intensity of the reflected laser beam which occurs in a later time portion of a related multi-pulse train. In addition, the sample-and-hold circuit 1 samples the output signal of the LPF 4 in response to every second sampling pulse, and then holds the sample of the output signal of the LPF 4. The sample-and-hold circuit 1 outputs the held signal sample to the CPU 5. The signal sample corresponding to the second sampling pulse represents a bottom value (a base value) Vsp of the detected intensity of the reflected laser beam in a time interval from which the formation of a recording mark is absent or a time interval between multi-pulse trains. The bottom value Vsp is smaller than the mean value Vmp. The bottom value Vsp is equal to a predetermined small value corresponding to a light power of, for example, 1 mW.

The CPU 5 includes a combination of an input/output port, a processing section, a ROM, and a RAM. The CPU 5 operates in accordance with a control program stored in the ROM. The input/output port in the CPU 5 contains an analog-to-digital converter for changing the output signal of the sample-and-hold circuit 1 into a corresponding digital signal which is handled by the processing section in the CPU 5.

According to the control program, the CPU 5 periodically derives the mean value Vmp and the bottom value Vsp from the output signal of the sample-and-hold circuit 1. The CPU 5 subtracts the bottom value Vsp from the mean value Vmp to calculate the difference "Vmp−Vsp", or divides the mean value Vmp by the bottom value Vsp to calculate the ratio "Vmp/Vsp". The CPU 5 has information representing a setting recording power or a detected recording power. The CPU 5 divides the mean value Vmp by the setting recording power (or the detected recording power). Alternatively, the CPU 5 may divide the difference "Vmp−Vsp" or the ratio "Vmp/Vsp" by the setting recording power (or the detected recording power). The division result represents detected conditions of the formation of every recording mark.

Preferably, the LPF 4 attenuates a signal component, which has a frequency equal to the frequency of multi-pulse trains, by at least 30 dB. In this case, the level of a ripple caused by a multi-pulse train and remaining in the output signal of the LPF 4 corresponds to 3% or less.

The CPU 5 calculates (or estimates) a timing at which the voltage of the output signal of the I/V converter 3 peaks in response to first one among pulses in every multi-pulse train. The CPU 5 outputs a sampling pulse to the sample-and-hold circuit 11 at the calculated timing. The sample-and-hold circuit 11 samples the output signal of the I/V converter 3 in response to every sampling pulse, and then holds the resultant sample of the output signal of the I/V converter 3. The signal sample represents a maximal value Vtop of the detected intensity of the reflected laser beam which corresponds to first one among pulses in the related multi-pulse train. The sample-and-hold circuit 11 outputs the held signal sample to the CPU 5.

The sample-and-hold circuit 11 may include a peak detector for detecting a voltage peak of the output signal of the I/V converter 3 for every multi-pulse train. In this case, the detected voltage peak is caused by first one among pulses in the related multi-pulse train. The sample-and-hold circuit 11 holds the detected voltage peak, and outputs the held voltage peak to the CPU 5. The detected voltage peak represents a maximal value Vtop of the detected intensity of the reflected laser beam which corresponds to first one among pulses in the related multi-pulse train.

As previously mentioned, the CPU 5 periodically derives the mean value Vmp and the bottom value Vsp from the output signal of the sample-and-hold circuit 1. The CPU 5 subtracts the bottom value Vsp from the mean value Vmp to calculate the difference "Vmp−Vsp", or divides the mean value Vmp by the bottom value Vsp to calculate the ratio "Vmp/Vsp". The input/output port in the CPU 5 contains an analog-to-digital converter for changing the output signal of the sample-and-hold circuit 11 into a corresponding digital signal which is handled by the processing section in the CPU 5. The CPU 5 periodically derives the maximal value Vtop from the output signal of the sample-and-hold circuit 11. The CPU 5 divides the mean value Vmp by the maximal value Vtop. Alternatively, the CPU 5 may divide the difference "Vmp−Vsp" or the ratio "Vmp/Vsp" by the maximal value Vtop. The division result represents detected conditions of the formation of every recording mark.

It should be noted that the sample-and-hold circuit 11 may be omitted. In this case, the CPU 5 operates independent of the maximal value Vtop.

The photodiode 8 is exposed to a portion of the forward laser beam emitted from the laser diode 7. The photodiode 8 detects the power (or the intensity) of the forward laser beam, and generates a current signal representing the detected power (or the detected intensity). The photodiode 8 outputs the current signal to the I/V converter 9.

The I/V converter 9 changes the current signal into a corresponding voltage signal. The voltage signal generated by the I/V converter 9 represents the detected power (or the detected intensity) of the forward laser beam. Specifically, the level of the voltage signal rises as the detected power increases. The I/V converter 9 outputs the voltage signal to the APC circuit 10 and the sample-and-hold circuit 12.

The CPU 5 calculates (or estimates) a timing at which the laser diode 7 is activated by specified one among pulses in every multi-pulse train. The CPU 5 outputs a sampling pulse to the sample-and-hold circuit 12 at the calculated timing. The sample-and-hold circuit 12 samples the output signal of the I/V converter 9 in response to every sampling pulse, and then holds the resultant sample of the output signal of the I/V converter 9. The signal sample represents the detected power (or the detected intensity) of the forward laser beam which corresponds to specified one among pulses in the related multi-pulse train. The sample-and-hold circuit 12 outputs the held signal sample to the CPU 5. The input/output port in the CPU 5 contains an analog-to-digital converter for changing the output signal of the sample-and-hold circuit 12 into a corresponding digital signal which is handled by the processing section in the CPU 5. The CPU 5 derives the detected power of the forward laser beam from the output signal of the sample-and-hold circuit 12. The CPU 5 sets the detected power of the forward laser beam as the detected recording power. As previously mentioned, the detected recording power is used in detecting conditions of the formation of every recording mark.

The detected recording power may be replaced by the setting recording power provided by the CPU 5. In this case, the sample-and-hold circuit 12 is omitted.

The CPU 5 has information representing target conditions of the formation of every recording mark, and also information representing an optimal recording power corresponding to the target conditions of the formation of every recording mark. The CPU 5 calculates the error (the deviation) of the detected conditions of the formation of every recording mark from the target conditions thereof. The calculated error corresponds to a power error. The CPU 5 controls the LD controller 6 in response to the calculated error to equalize the detected conditions to the target conditions. Specifically, the CPU 5 generates a control signal in response to the calculated error, and outputs the generated control signal to the LD controller 6.

The LD controller 6 generates a basic LD drive signal (a first LD drive signal) in response to the control signal fed from the CPU 5. The basic LD drive signal contains multi-pulse trains, the amplitude of which is determined by the control signal. The multi-pulse trains represent information to be recorded. The LD controller 6 outputs the basic LD drive signal to the differential amplifier 13.

The APC circuit 10 derives the detected power of the forward laser beam from the output signal of the I/V converter 9. The APC circuit 10 generates a corrective voltage signal in response to the detected power of the forward laser beam. The APC circuit 10 outputs the corrective voltage signal to the differential amplifier 13.

The differential amplifier 13 subtracts the corrective voltage signal from the basic LD drive signal, and generates a final LD drive signal (a second LD drive signal) in response to the subtraction result. The final LD drive signal contains multi-pulse trains representing information to be recorded. The differential amplifier 13 outputs the final LD drive signal to the laser diode 7. The laser diode 7 is activated and deactivated by the final LD drive signal, thereby emitting a forward laser beam which is modulated in accordance with the information to be recorded. The intensity or power of the forward laser beam depends on the amplitude of every multi-pulse train in the final LD drive signal.

The laser diode 7, the photodiode 8, the I/V converter 9, and the APC circuit 10 compose an APC feedback loop for regulating the power of the forward laser beam at a desired level. On the other hand, the control of the LD controller 6 by the CPU 5 is designed to implement adjustment in the power of the forward laser beam for equalizing the detected conditions of the formation of every recording mark to the target conditions thereof. In general, the power adjustment by the CPU 5 is predominant over the power control by the APC circuit 10.

Information to be recorded is modulated on an EFM (eight to fourteen modulation) basis using an EFM code and synchronized with a channel clock signal. The information is recorded on the optical disc 15 in a mark edge recording technique (a mark length recording technique). EFM-resultant data, that is, bi-level data resulting from EFM of the information, are recorded on the optical disc 15 as marks and spaces formed thereon. The data to be recorded repetitively change between a high level state and a low level state corresponding to a mark and a space respectively. The data length for a mark and the data length for a space are variable from 3T to 14T, where "T" denotes the period of the channel clock signal. The LD controller 6 includes a conventional circuit for generating a multi-pulse train, the amplitude of which is variable. A time segment of the data which corresponds to one mark is converted into one multi-pulse train by the previously-mentioned conventional circuit in the LD controller 6. Thus, one multi-pulse train is assigned to one mark. The length of a multi-pulse train corresponds to the data length for the related mark.

Preferably, the CPU 5 rejects the output signal of the sample-and-hold circuit 1 which corresponds to multi-pulse trains shorter than 7T in data length. In this case, the CPU 5 accepts the output signal of the sample-and-hold circuit 1 which corresponds to only multi-pulse trains equal to or longer than 7T in data length. More preferably, the CPU 5 rejects the output signal of the sample-and-hold circuit 1 which corresponds to multi-pulse trains shorter than 14T. In this case, the CPU 5 accepts the output signal of the sample-and-hold circuit 1 which corresponds to only multi-pulse trains equal in data length to 14T. Alternatively, the CPU 5 may accept the output signal of the sample-and-hold circuit 1 which corresponds to only multi-pulse trains equal in data length to nT being a later run length, where "n" denotes a predetermined natural number.

The CPU 5 may determine the mean value Vmp, the difference "Vmp–Vsp", or the ratio "Vmp/Vsp" on the basis of the output signal of the sample-and-hold circuit 1 which corresponds to at least two multi-pulse trains. In this case, the accuracy of the mean value Vmp, the difference "Vmp–Vsp", or the ratio "Vmp/Vsp" can be prevented from unacceptably dropping due to a defect in the optical disc 15.

The CPU 5 may determine the mean value Vmp, the difference "Vmp–Vsp", or the ratio "Vmp/Vsp" on the basis of the output signal of the sample-and-hold circuit 1 which corresponds to at least two multi-pulse trains assigned to a common angular position on the optical disc 15. In this case, the accuracy of the mean value Vmp, the difference "Vmp–Vsp", or the ratio "Vmp/Vsp" can be prevented from unacceptably dropping due to a warp in the optical disc 15.

Operation of the apparatus of FIG. 1 can be changed among different modes including a recording mode and a test mode. In general, the apparatus of FIG. 1 is operated in the test mode before being operated in the recording mode. During the test mode of operation, a signal representative of a test pattern is repetitively recorded on an optical disc 15 while the power of a forward laser beam emitted from the laser diode 7 is varied. In addition, the output signals of the sample-and-hold circuits 1, 11, and 12 are monitored. The recorded signal is reproduced from the optical disc 15 while the relation between the reproduced signal and the power of the forward laser beam is grasped. Observations are given of conditions of the reproduced signal which relate to the symmetry of a short mark relative to a long mark, or which relate to jitters. A time segment of the reproduced signal corresponding to the best mark symmetry or the least jitters is detected, and the power of the forward laser beam which corresponds to the detected time segment of the reproduced signal is defined as an optimal recording power. The output signals of the sample-and-hold circuits 1, 11, and 12 which correspond to the optimal recording power are considered to be an indication of target conditions of the formation of every recording marks. A memory within the CPU 5 is loaded with information representing the target conditions of the formation of every recording mark, and also information representing the optimal recording power. The information representing the target conditions and the information representing the optimal recording power are used during the recording mode of operation which follows the test mode of operation.

The optical disc 15 is of a WO (write once) type using organic pigment. Information to be recorded is converted into data of the DVD-R format which are written on the optical disc 15. As previously mentioned, information to be recorded is modulated on an EFM basis using an EFM code and synchronized with a channel clock signal. The information is recorded on the optical disc 15 in a mark edge recording technique (a mark length recording technique). EFM-resultant data, that is, bi-level data resulting from EFM of the information, are recorded on the optical disc 15 as marks and spaces formed thereon.

Figure 2:
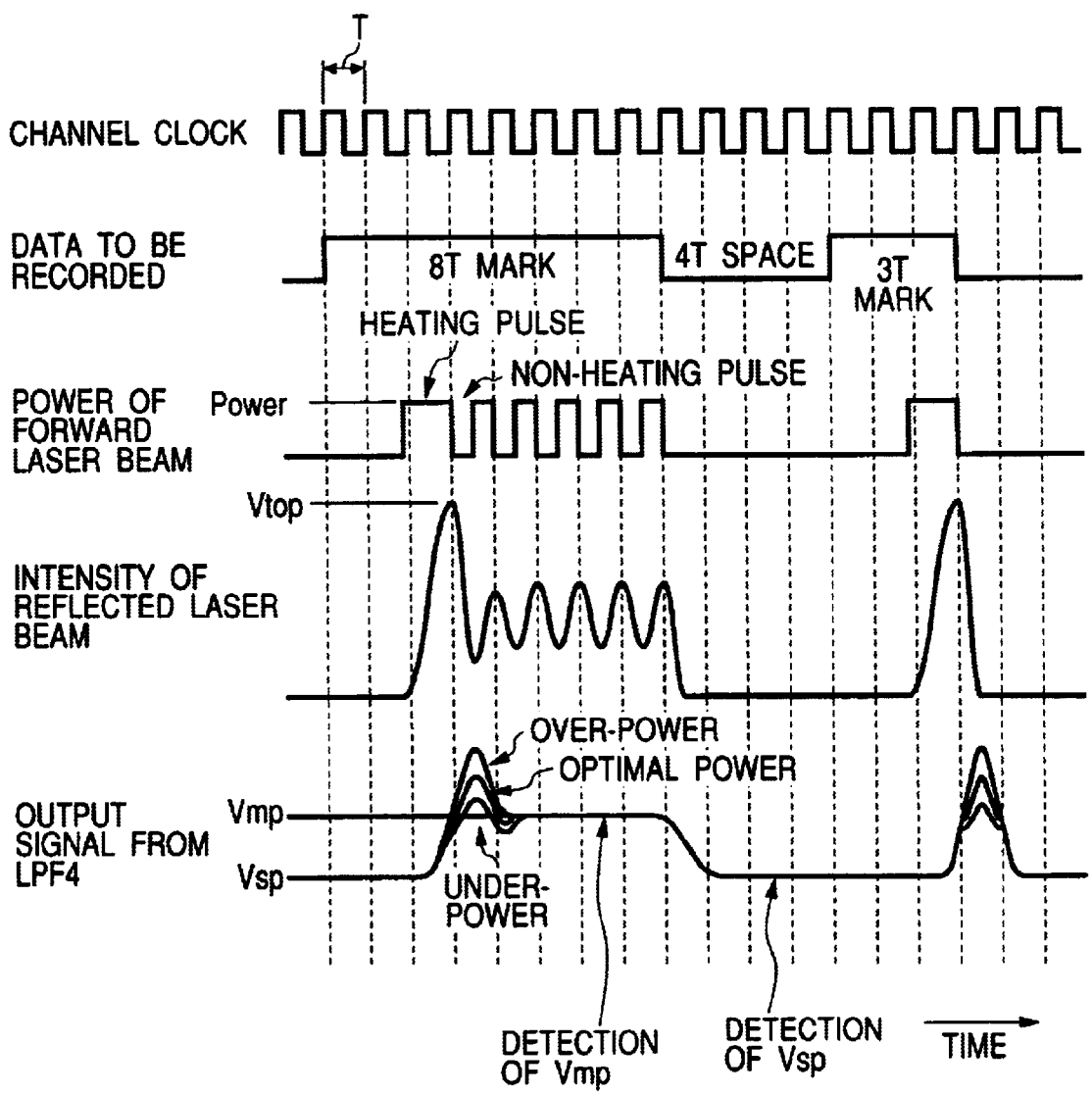
FIG. 2 is a time-domain diagram of an example of signals, data, the power of a forward laser beam, and the intensity of a reflected laser beam in the apparatus of FIG. 1.

As shown in FIG. 2, the data to be recorded are synchronized with the channel clock signal having a fixed period T. The data to be recorded repetitively change between a high level state and a low level state corresponding to a mark and a space respectively. The data length for a mark and the data length for a space are variable from 3T to 14T. Specifically, a 14T mark is assigned to a sync signal. In FIG. 2, a high level state corresponding to an 8T mark, a low level state corresponding to a 4T space, and a high level state corresponding to a 3T mark are sequentially arranged in that order.

During the recording of the data, the optical disc 15 is rotated at a speed controlled on a CLV (constant linear velocity) basis. For example, the fixed period T is equal to about 38 nsec while the recording linear velocity is equal to about 3.5 m/s.

Every time segment of the data which corresponds to one mark is converted by the LD controller 6 into one multi-pulse train. Thus, one multi-pulse train is assigned to one mark. The length of a multi-pulse train corresponds to the data length for the related mark. Each of multi-pulse trains except shortest ones has sequentially-occurring pulses. Preferably, the width (the length) of first one among pulses in every multi-pulse train is set to a first value while the widths (the lengths) of second and later pulses therein are set to a second value smaller than the first value. In other words, first one among pulses in every multi-pulse train is longer than second and later pulses therein. For example, first one among pulses in every multi-pulse train is equal to or longer than 1T in length while second and later pulses therein are shorter than 1T. The number of pulses in one multi-pulse train depends on the data length for the related mark. The trailing edge of the last pulse in every multi-pulse train coincides with the end of the data length for the related mark. Every multi-pulse train in an electric signal is transmitted from the LD controller 6 to the laser diode 7, being converted by the laser diode 7 into a corresponding multi-pulse train of the forward laser beam. As shown in FIG. 2, a usual multi-pulse train of the forward laser beam has an alternation of positive-polarity pulses and negative-polarity pulses. The positive-polarity pulses are caused by pulses in a corresponding electric multi-pulse train. The positive-polarity pulses are referred to as heating pulses, while the negative-polarity pulses are referred to as non-heating pulses.

As shown in FIG. 2, the intensity of the reflected laser beam which is represented by the output signal of the I/V converter 3 varies in accordance with the power of the forward laser beam. The intensity of the reflected laser beam varies in a sawtooth waveform corresponding to a multi-pulse train of the forward laser beam. Specifically, the intensity of the reflected laser beam peaks in correspondence with each of heating pulses in a multi-pulse train of the forward laser beam. Since first one among heating pulses in a multi-pulse train of the forward laser beam is longer than second and later heating pulses therein, a reflected-laser-beam peak corresponding to the first pulse is higher than those corresponding to the second and later pulses. The reflected-laser-beam peak corresponding to the first pulse is detected by the sample-and-hold circuit 11 as a maximal value Vtop of the detected intensity of the reflected laser beam.

The output signal of the I/V converter 3 which represents the intensity of the reflected laser beam is smoothed by the LPF 4. As shown in FIG. 2, the output signal of the LPF 4 varies in a waveform resulting from smoothing the waveform of the intensity of the reflected laser beam. For every multi-pulse of the forward laser beam, the voltage of the output signal of the LPF 4 increases from a bottom level (a base level) to a peak level and then drops from the peak level to an intermediate level before continuing to be equal to the intermediate level. The bottom level corresponds to a bottom value (a base value) Vsp of the intensity of the reflected laser beam while the intermediate level corresponds to a mean value Vmp of the intensity of the reflected laser beam which occurs in a later time portion of a related multi-pulse train of the forward laser beam. At a given timing within a later time portion of every multi-pulse train of the forward laser beam, the output signal of the LPF 4 is sampled by the sample-and-hold circuit 1 so that a mean value Vmp of the intensity of the reflected laser beam is detected. The detected mean value Vmp indicates recording conditions, that is, conditions of the formation of a related recording mark. At a given timing after the end of every multi-pulse train of the forward laser beam, the output signal of the LPF 4 is sampled by the sample-and-hold circuit 1 so that a bottom value Vsp of the intensity of the reflected laser beam is detected.

Figure 3:
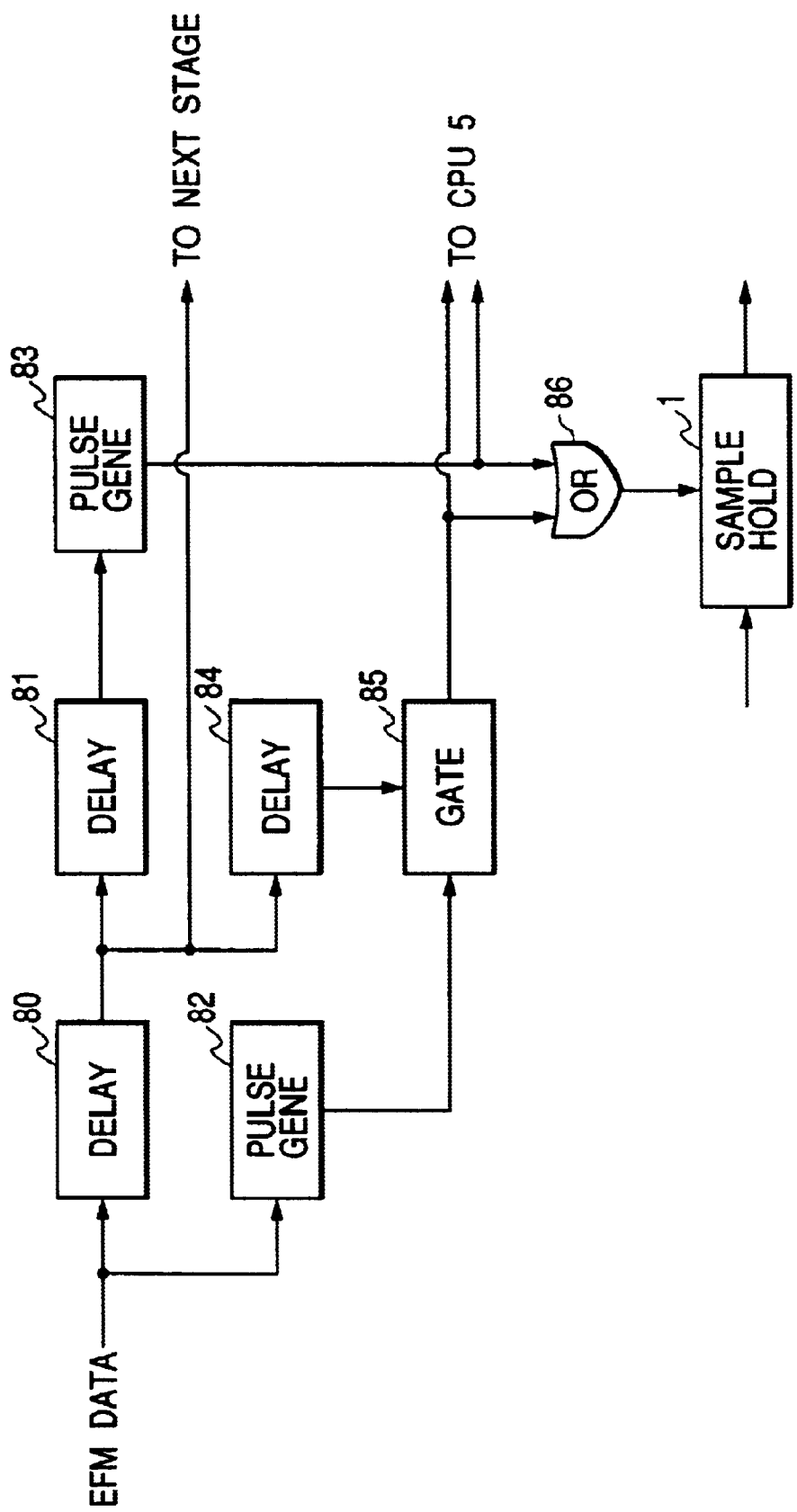
FIG. 3 is a block diagram of an example of a portion of the apparatus in FIG. 1.

The apparatus of FIG. 1 includes a portion for repetitively feeding a sampling pulse to the sample-and-hold circuit 1. FIG. 3 shows an example of this portion of the apparatus. With reference to FIG. 3, EFM-resultant data are applied to a delay circuit 80 and a pulse generator 82. The delay circuit 80 defers the EFM-resultant data by a predetermined time interval equal to the time interval between the timing of the detection of the mean value Vmp and the end of a multi-pulse train. The deferred EFM-resultant data are referred to as a first delayed EFM-resultant data. The delay circuit 80 outputs the first delayed EFM-resultant data to a delay circuits 81 and 84, and a next stage for converting the first delayed EFM-resultant data into multi-pulse trains. The delay circuit 81 defers the first delayed EFM-resultant data by a predetermined time interval equal to the time interval between the end of a multi-pulse train and the timing of the detection of the bottom value Vsp. The deferred EFM-resultant data are referred to as a second delayed EFM-resultant data. The delay circuit 81 outputs the second delayed EFM-resultant data to a pulse generator 83. The delay circuit 84 defers the first delayed EFM-resultant data by a given time interval. The deferred EFM-resultant data are referred to as a third delayed EFM-resultant data. The delay circuit 84 outputs the third delayed EFM-resultant data to a gate 85. The pulse generator 82 produces a first sampling pulse in response to every falling edge in the EFM-resultant data. The pulse generator 82 outputs the first sampling pulse to the gate 85. The gate 85 is open when the third delayed EFM-resultant data are in a high level state. The gate 85 is closed when the third delayed EFM-resultant data are in a low level state. When the gate 85 is open, the first sampling pulse passes therethrough and travels to an OR circuit 86 and the CPU 5. Then, the first sampling pulse passes through the OR circuit 86 before reaching the sample-and-hold circuit 1. When the gate 85 is closed, the first sampling pulse is inhibited from passing therethrough. The pulse generator 83 produces a second sampling pulse in response to every falling edge in the second delayed EFM-resultant data. The pulse generator 83 outputs the second sampling pulse to the OR circuit 86 and the CPU 5. The second sampling pulse passes through the OR circuit 86 before reaching the sample-and-hold circuit 1. The sample-and-hold circuit 1 samples the output signal of the LPF 4 in response to each of the received first and second sampling pulses, and then holds the resultant sample of the output signal of the LPF 4. Each first sampling pulse corresponds to a mean value Vmp while each second sampling pulse corresponds to a bottom value (a base value) Vsp. The CPU 5 determines, on the basis of the received first and second sampling pulses, whether the output signal of the sample-and-hold circuit 1 represents a mean value Vmp or a bottom value Vsp.

Figure 4:
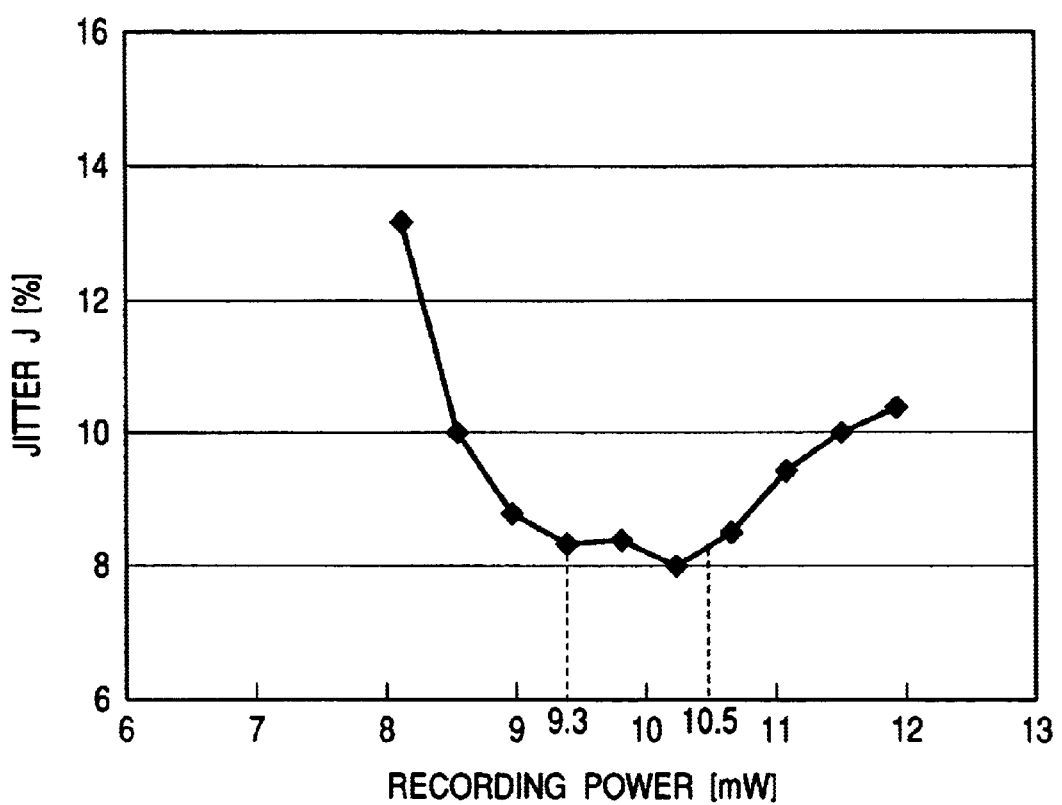
FIG. 4 is a diagram of the relation between the recording power of the forward laser beam and the jitter J of a recording mark on an optical disc.

FIG. 4 shows the relation between the power (the recording power or the mark-recording power) of the forward laser beam and the jitter J of a recording mark on the optical disc 15. As shown in FIG. 4, the jitter J is relatively low when the recording power is in the range between 9.3 mW and 10.5 mW. Accordingly, a preferable range of the recording power extends between 9.3 mW and 10.5 mW.

Figure 5:
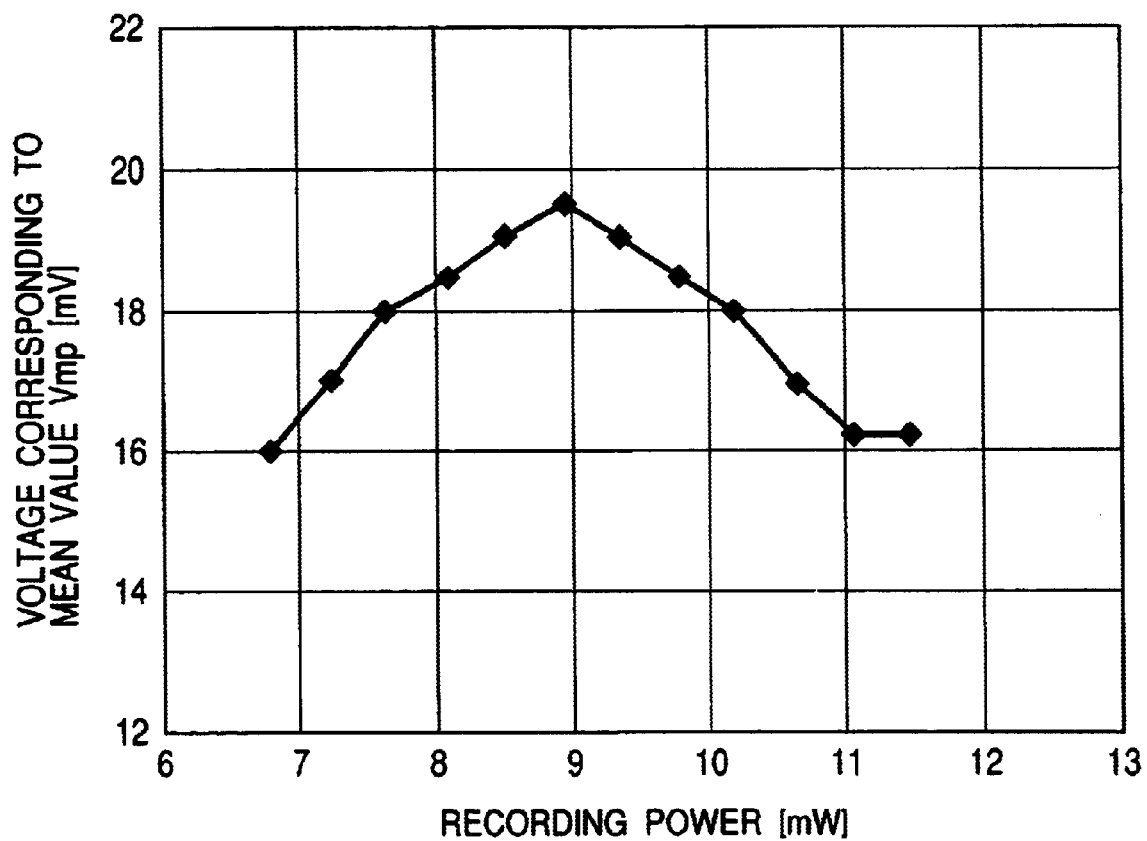
FIG. 5 is a diagram of the relation between the recording power of the forward laser beam and the voltage of the output signal of a low pass filter which corresponds to a mean value Vmp of the intensity of the reflected laser beam.

FIG. 5 shows the relation between the power (the recording power or the mark-recording power) of the forward laser beam and the voltage of the output signal of the LPF 4 which corresponds to the mean value Vmp of the intensity of the reflected laser beam. As previously mentioned, the mean value Vmp occurs in a later time portion of a multi-pulse train. With reference to FIG. 5, the LPF output voltage increases to a peak level as the recording power increases from about 7 mW to about 9 mW. The LPF output voltage decreases from the peak level as the recording power increases from about 9 mW to about 11 mW.

Figure 6:
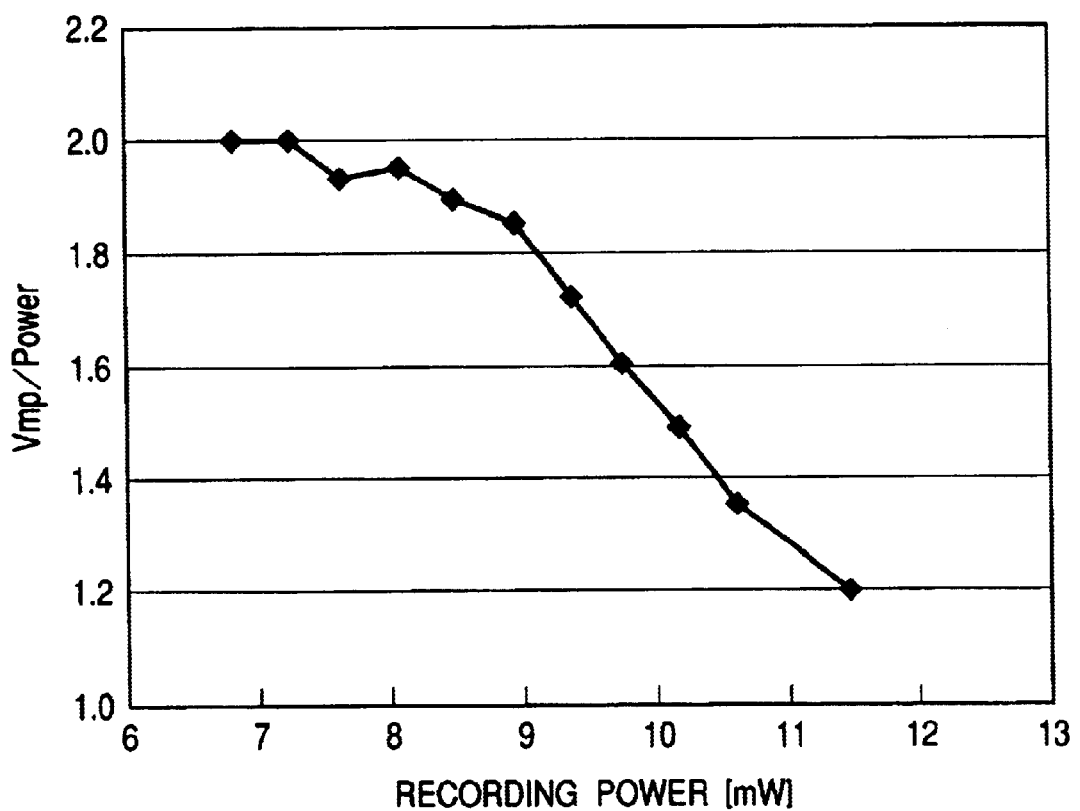
FIG. 6 is a diagram of the relation between the recording power of the forward laser beam and the result of dividing the mean value Vmp of the intensity of the reflected laser beam by the recording power.

FIG. 6 shows the relation between the power (the recording power or the mark-recording power) of the forward laser beam and the result of dividing the mean value Vmp of the intensity of the reflected laser beam by the recording power. With reference to FIG. 6, the division result monotonically decreases as the recording power increases from 9 mW to 11 mW. This relation indicates that the recording power can be maintained in the previously-mentioned preferable range by feedback control responsive to the division result. As previously explained, the jitter J of a recording mark is relatively low when the recording power is in the preferable range.

Regarding the control of the recording power, the mean value Vmp of the intensity of the reflected laser beam may be replaced by the value "Vmp–Vsp" or the value "Vmp/Vsp", where Vsp denotes the bottom value of the intensity of the reflected laser beam. The recording power uses the setting recording power, the intensity of the forward laser beam, or the maximal value Vtop of the intensity of the reflected laser beam which corresponds to first one among pulses in a multi-pulse train.

Figure 7:
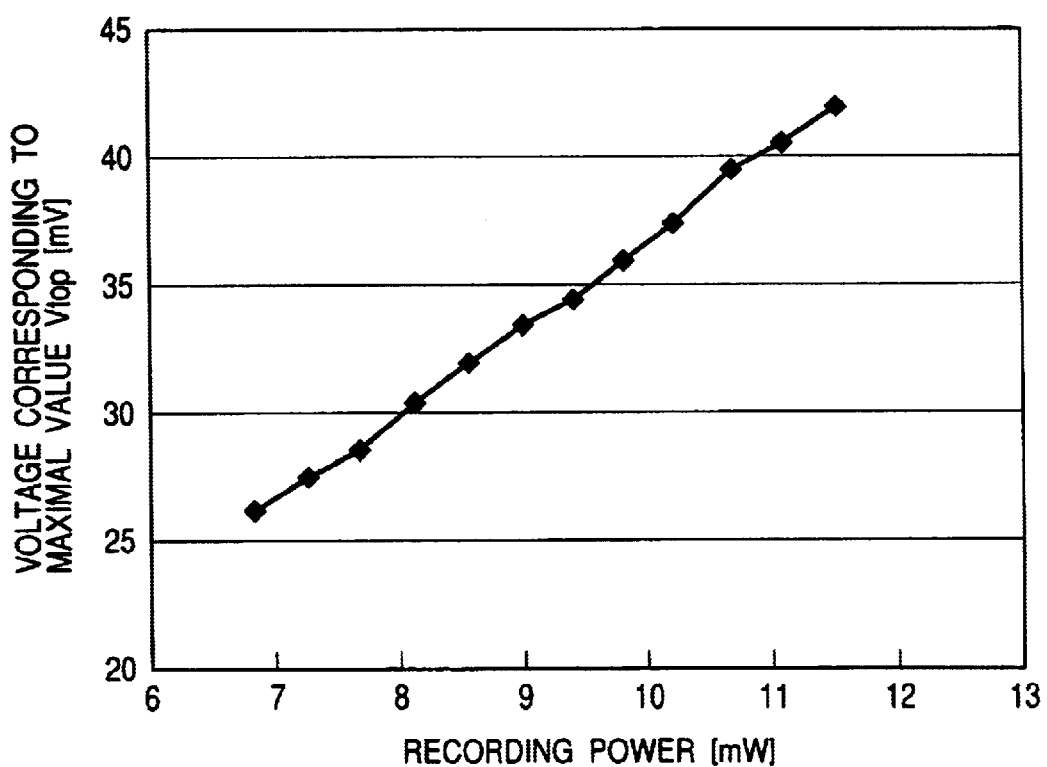
FIG. 7 is a diagram of the relation between the recording power of the forward laser beam and the voltage of the output signal of an I/V converter which corresponds to a maximal value Vtop of the intensity of the reflected laser beam.

FIG. 7 shows the relation between the power (the recording power or the mark-recording power) of the forward laser beam and the voltage of the output signal of the I/V converter 3 which corresponds to the maximal value Vtop of the intensity of the reflected laser beam. As previously mentioned, the maximal value Vtop corresponds to first one among pulses in a multi-pulse train. As shown in FIG. 5, the maximal value Vtop of the intensity of the reflected laser beam is proportional to the recording power.

Figure 8:
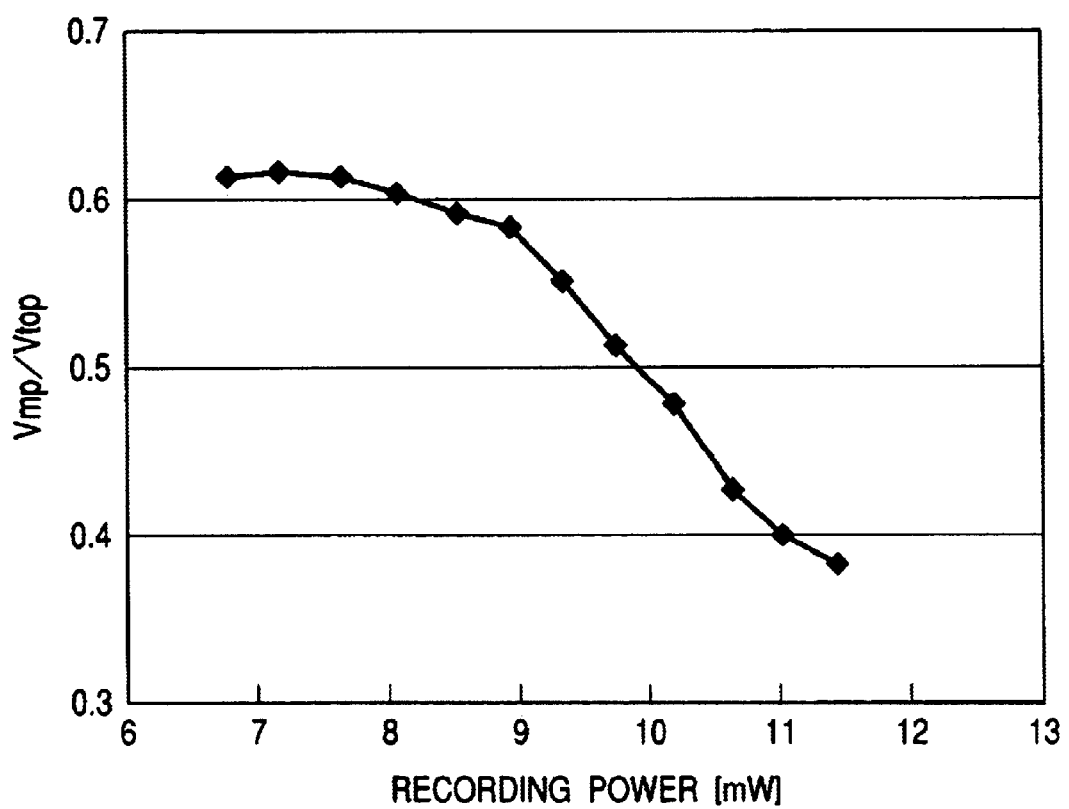
FIG. 8 is a diagram of the relation between the recording power of the forward laser beam and the result of dividing the mean value Vmp of the intensity of the reflected laser beam by the maximal value Vtop thereof.

FIG. 8 shows the relation between the power (the recording power or the mark-recording power) of the forward laser beam and the result of dividing the mean value Vmp of the intensity of the reflected laser beam by the maximal value Vtop thereof. With reference to FIG. 8, the division result monotonically decreases as the recording power increases from 9 mW to 11 mW. This relation indicates that the recording power can be maintained in the previously-mentioned preferable range by feedback control responsive to the division result. As previously explained, the jitter J of a recording mark is relatively low when the recording power is in the preferable range.

Figure 9:
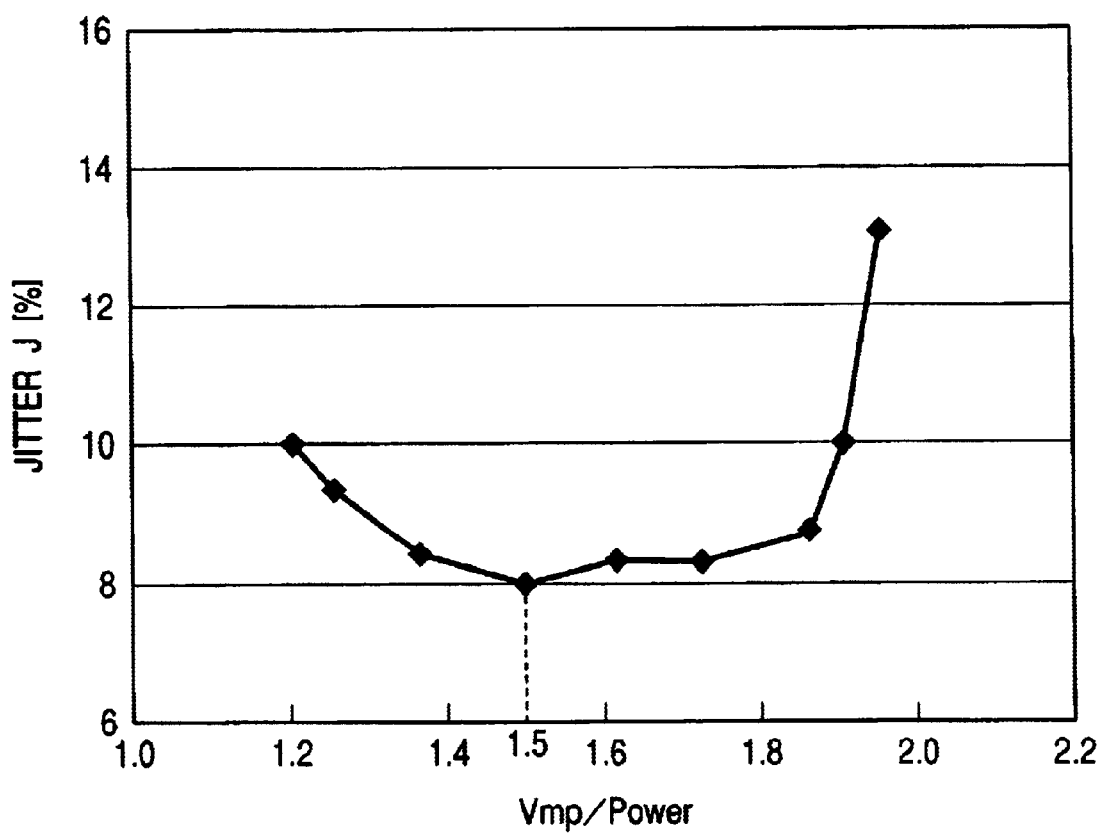
FIG. 9 is a diagram of the relation between a division result "Vmp/Power" and the jitter J of a recording mark on the optical disc.

The result of dividing the mean value Vmp of the intensity of the reflected laser beam by the recording power is denoted by "Vmp/Power". FIG. 9 shows the relation between the division result "Vmp/Power" and the jitter J of a recording mark on the optical disc 15. With reference to FIG. 9, the jitter J decreases to a minimum value as the division result "Vmp/Power" increases from 1.2 to 1.5. The jitter J increases from the minimum value as the division result "Vmp/Power" increases from 1.5. Thus, the jitter J is minimized at the division result "Vmp/Power" equal to 1.5. Accordingly, in FIG. 9, the division result "Vmp/Power" equal to 1.5 is considered to be optimal. Such an optimal division result "Vmp/Power" is found in advance. The optimal division result "Vmp/Power" is set as a target division result "Vmp/Power". During operation of the apparatus of FIG. 1, recording conditions are detected, and a division result "Vmp/Power" is calculated on the basis of the detected recording conditions. The recording power is controlled to equalize the calculated division result "Vmp/Power" to the target division result "Vmp/Power". In the case of the relation of FIG. 9, the recording power is controlled to equalize the calculated division result "Vmp/Power" to 1.5.

Figure 10:
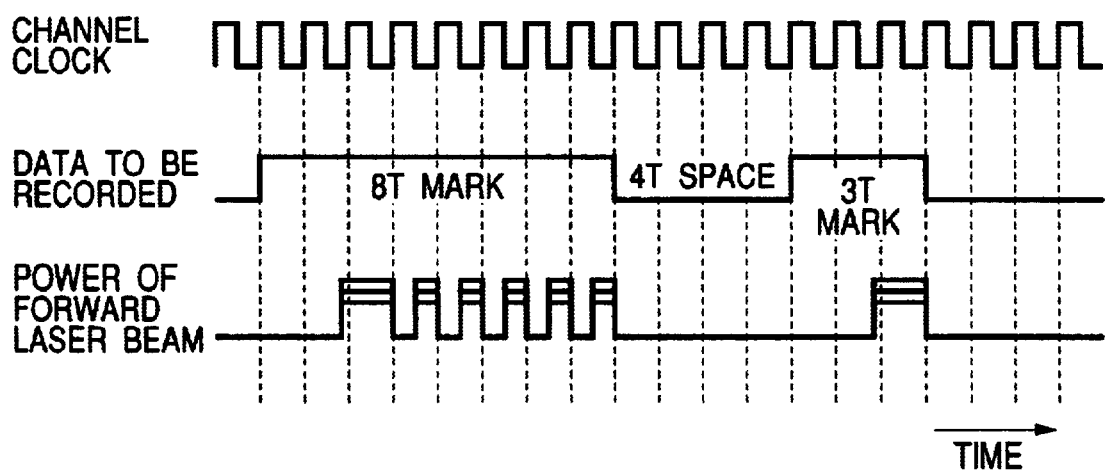
FIG. 10 is a time-domain diagram of an example of a signal, data, and the power of a forward laser beam in the apparatus of FIG. 1.

As previously mentioned, the apparatus of FIG. 1 is operated in the test mode before being operated in the recording mode. The test mode of operation determines the optimal recording power on the basis of asymmetry conditions or jitter conditions of a reproduced signal. The optimal recording power corresponds to the target conditions of the formation of every recording mark. In addition, the test mode of operation determines the target division result "Vmp/Power" which corresponds to the optimal recording power. Since the optimal recording power corresponds to the target conditions of the formation of every recording mark, the target division result "Vmp/Power" also corresponds thereto. During the recording mode of operation which follows the test mode of operation, recording conditions are detected via the photodetectors 2 and 8, and a division result "Vmp/Power" is calculated on the basis of the detected recording conditions. The CPU 5 computes the error between the calculated division result "Vmp/Power" and the target division result "Vmp/Power". The CPU 5 controls the amplitude of a multi-pulse train, which is generated by the LD controller 6, in response to the computed error. As a result, the power (or the intensity) of the forward laser beam emitted from the laser diode 7 is controlled in response to the computed error. This power control is designed to equalize the calculated division result "Vmp/Power" to the target division result "Vmp/Power". Thus, actual conditions of the formation of every recording mark are held equal to the target conditions thereof. As shown in FIG. 10, the power (or the intensity) of the forward laser beam can be changed among, for example, three different levels.

As previously mentioned, at a given timing within a later time portion of every multi-pulse train of the forward laser beam, the output signal of the LPF 4 is sampled by the sample-and-hold circuit 1 to detect the mean value Vmp of the intensity of the reflected laser beam. Preferably, the sampling timing is decided in consideration of an acquisition time and an aperture delay of the sample-and-hold circuit 1. Generally, the sampling timing follows the time point of the center of the duration of the related multi-pulse train. Preferably, the sampling timing precedes the end of the duration of the related multi-pulse train by a time interval of about 1.0T.

Second Embodiment

Figure 11:
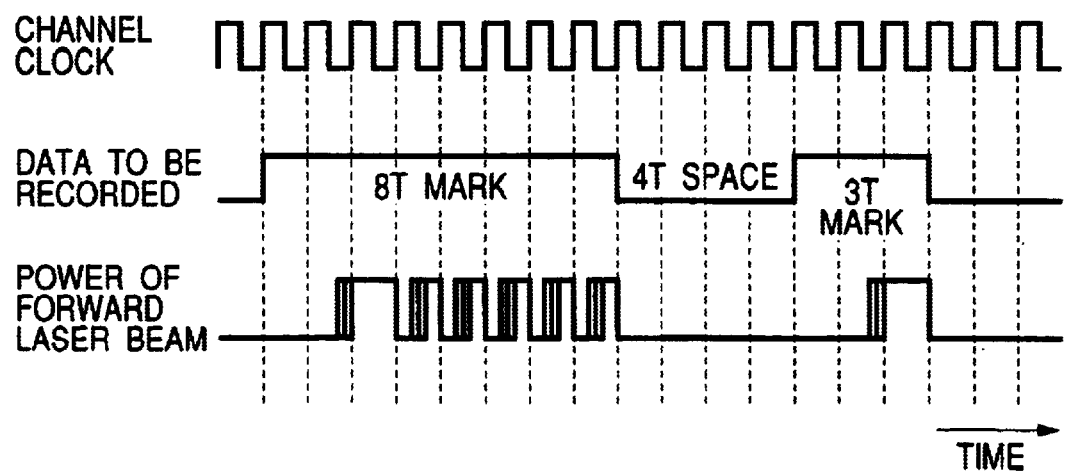
FIG. 11 is a time-domain diagram of an example of a signal, data, and the power of a forward laser beam in an information recording apparatus according to a second embodiment of this invention.

A second embodiment of this invention is similar to the first embodiment thereof except for an additional design mentioned later. In the second embodiment of this invention, the CPU 5 controls the duty cycle of a multi-pulse train, which is generated by the LD controller 6, in response to the computed error between the calculated division result "Vmp/Power" and the target division result "Vmp/Power". This control is designed to equalize the calculated division result "Vmp/Power" to the target division result "Vmp/Power". The duty cycle of a multi-pulse train of the forward laser beam is equal to the duty cycle of a corresponding multi-pulse train generated by the LD controller 6. As shown in FIG. 11, the duty cycle of a multi-pulse train of the forward laser beam is variable. The duty cycle of a multi-pulse train of the forward laser beam depends on the ratio between the sum of the lengths of heating pulses and the sum of the lengths of non-heating pulses.

According to a first example, the duty-cycle control and the amplitude control are executed independently of each other.

According to a second example, the duty-cycle control and the amplitude control are executed in connection with each other. Normally, the amplitude control is active while the duty-cycle control is inactive. In the case where the amplitude of a multi-pulse train reaches its upper limit as a result of the execution of the amplitude control, the duty-cycle control is executed while the amplitude of a multi-pulse train is held equal to its upper limit. During the execution of the duty cycle control, the power error from the optimal recording power is converted into a required increase in the duty cycle of a multi-pulse train. The actual duty cycle of a multi-pulse train is varied in accordance with the required increase.

Third Embodiment

A third embodiment of this invention is similar to the first embodiment thereof except for a design change mentioned later. The third embodiment of this invention replaces the apparatus portion in FIG. 3 with an apparatus portion in FIG. 12.

Figure 12:
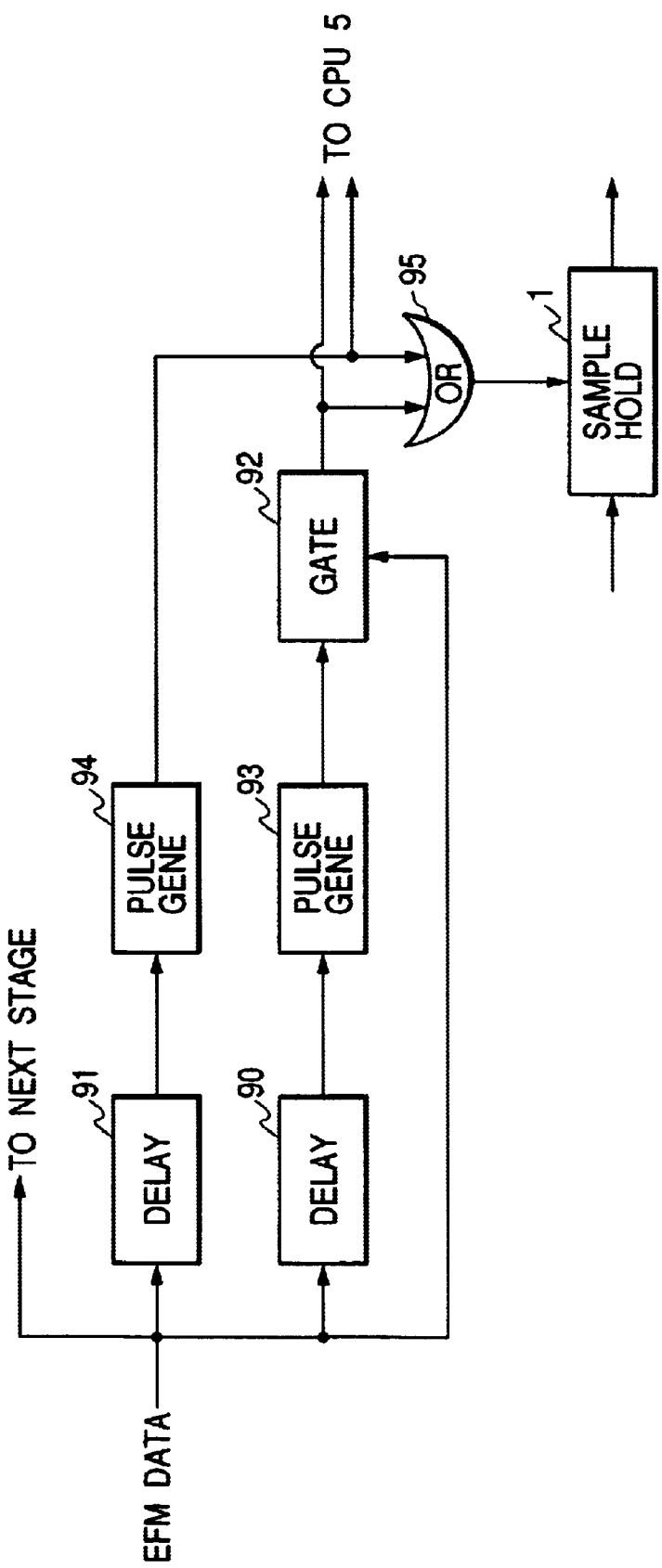
FIG. 12 is a block diagram of a portion of an information recording apparatus according to a third embodiment of this invention.

With reference to FIG. 12, EFM-resultant data are applied to delay circuits 90 and 91, a gate 92, and a next stage for converting the EFM-resultant data into multi-pulse trains. The delay circuit 90 defers the EFM-resultant data by a predetermined time interval. The deferred EFM-resultant data are referred to as a first delayed EFM-resultant data. The delay circuit 90 outputs the first delayed EFM-resultant data to a pulse generator 93. The pulse generator 93 produces a first sampling pulse in response to every rising edge in the first delayed EFM-resultant data. The pulse generator 93 outputs the first sampling pulse to the gate 92. The gate 92 is open when the EFM-resultant data are in a high level state. The gate 92 is closed when the EFM-resultant data are in a low level state. When the gate 92 is open, the first sampling pulse passes therethrough and travels to an OR circuit 95 and the CPU 5. Then, the first sampling pulse passes through the OR circuit 95 before reaching the sample-and-hold circuit 1. When the gate 92 is closed, the first sampling pulse is inhibited from passing therethrough. On the other hand, the delay circuit 91 defers the EFM-resultant data by a predetermined time interval. The deferred EFM-resultant data are referred to as a second delayed EFM-resultant data. The delay circuit 91 outputs the second delayed EFM-resultant data to a pulse generator 94. The pulse generator 94 produces a second sampling pulse in response to every falling edge in the second delayed EFM-resultant data. The pulse generator 94 outputs the second sampling pulse to the OR circuit 95 and the CPU 5. The second sampling pulse passes through the OR circuit 95 before reaching the sample-and-hold circuit 1. The sample-and-hold circuit 1 samples the output signal of the LPF 4 in response to each of the received first and second sampling pulses, and then holds the resultant sample of the output signal of the LPF 4. Each first sampling pulse corresponds to a mean value Vmp while each second sampling pulse corresponds to a bottom value Vsp. The CPU 5 determines, on the basis of the received first and second sampling pulses, whether the output signal of the sample-and-hold circuit 1 represents a mean value Vmp or a bottom value Vsp.

What is claimed is:

1. A method of recording information on an optical disc, comprising the steps of:

applying multi-pulse trains of a forward laser beam to the optical disc to record mark areas thereon, the multi-pulse trains corresponding to the mark areas respectively;

detecting an intensity of a reflected laser beam which results from reflection of the forward laser beam by the optical disc;

dividing the detected intensity by a setting intensity to get a division result;

detecting a condition of recording of each of the mark areas in response to the division result; and controlling an amplitude of each of the multi-pulse trains in response to the detected condition.

2. A method as recited in claim 1, wherein the detected intensity comprises a detected mean intensity of the reflected laser beam which corresponds to a post-head time portion of each of the multi-pulse trains.

3. A method as recited in claim 2, wherein the detected mean intensity consists of a detected mean intensity of the reflected laser beam which corresponds to a post-head time portion of each of selected ones among the multi-pulse trains, and the selected multi-pulse trains correspond to mark data lengths between 7T and 14T, where "T" denotes a channel period.

4. A method as recited in claim 2, wherein the detected mean intensity consists of a detected mean intensity of the reflected laser beam which corresponds to a post-head time portion of each of selected ones among the multi-pulse trains, and the selected multi-pulse trains correspond to a maximum mark data length.

5. A method as recited in claim 2, wherein the detected mean intensity consists of a detected mean intensity of the reflected laser beam which corresponds to a post-head time portion of each of selected ones among the multi-pulse trains, and the selected multi-pulse trains correspond to a mark data length of nT being a later run length, where "T" denotes a channel period and "n" denotes a predetermined natural number.

6. A method as recited in claim 2, wherein the detected mean intensity comprises a detected mean intensity based on at least two detected mean intensities corresponding to two of the multi-pulse trains.

7. A method as recited in claim 2, wherein the detected mean intensity comprises a detected mean intensity based on at least two detected mean intensities corresponding to a common angular position on the optical disc.

8. A method as recited in claim 2, further comprising the step of using a filter to get the detected mean intensity, the filter attenuating a signal component having a frequency equal to a frequency of the multi-pulse trains by at least 30 dB.

9. A method as recited in claim 1, wherein the detected intensity comprises a difference between a detected mean intensity of the reflected laser beam which corresponds to a post-head time portion of each of the multi-pulse trains and a detected intensity of the reflected laser beam which corresponds to each of intervals between the multi-pulse trains.

10. A method as recited in claim 1, wherein the detected intensity comprises a ratio between a detected mean intensity of the reflected laser beam which corresponds to a post-head time portion of each of the multi-pulse trains and a detected intensity of the reflected laser beam which corresponds to each of intervals between the multi-pulse trains.

11. A method as recited in claim 1, wherein the detected intensity comprises one of (1) a difference and (2) a ratio between a detected mean intensity of the reflected laser beam which corresponds to a post-head time portion of each of the multi-pulse trains and a detected intensity of the reflected laser beam which corresponds to each of intervals between the multi-pulse trains.

12. A method as recited in claim 1, further comprising the step of controlling a duty cycle of each of the multi-pulse trains in response to the detected condition in cases where the amplitude thereof reaches its upper limit.

13. A method as recited in claim 1, wherein the detected intensity comprises a detected mean intensity of the reflected laser beam which corresponds to a time point in a later half time portion of each of the multi-pulse trains.

14. A method as recited in claim 1, wherein the detected intensity comprises a detected mean intensity of the reflected laser beam which corresponds to pulses except a first pulse in each of the multi-pulse trains.

15. A method of recording information on an optical disc, comprising the steps of:

applying multi-pulse trains of a forward laser beam to the optical disc to record mark areas thereon, the multi-pulse trains corresponding to the mark areas respectively;

detecting an intensity of a reflected laser beam which results from reflection of the forward laser beam by the optical disc;

detecting a maximal intensity of the reflected laser beam which is caused by first one among pulses in each of the multi-pulse trains;

dividing the detected intensity by the detected maximal intensity to get a division result;

detecting a condition of recording of each of the mark areas in response to the division result; and controlling an amplitude of each of the multi-pulse trains in response to the detected condition.

16. An apparatus for recording information on an optical disc, comprising:

first means for applying multi-pulse trains of a forward laser beam to the optical disc to record mark areas thereon, the multi-pulse trains corresponding to the mark areas respectively;

a photosensitive element receiving a reflected laser beam which results from reflection of the forward laser beam by the optical disc, the photosensitive element generating a current depending on an intensity of the reflected laser beam;

second means for converting the current generated by the photosensitive element into a voltage;

a low pass filter receiving the voltage generated by the second means for attenuating a component of the voltage which has a frequency equal to a frequency of the multi-pulse trains;

a sample-and-hold circuit for detecting, on the basis of an output signal from the low pass filter, a mean intensity of the reflected laser beam which corresponds to each of the multi-pulse trains;

third means for dividing one of (1) the detected mean intensity, (2) a difference between the detected mean intensity and a detected intensity of the reflected laser beam which corresponds to each of intervals between the multi-pulse trains, and (3) a ratio between the detected mean intensity and a detected intensity of the reflected laser beam which corresponds to each of intervals between the multi-pulse trains by a setting intensity to generate a division result; and fourth means for detecting a condition of recording of each of the mark areas in response to the division result generated by the third means.

17. An apparatus for recording information on an optical disc, comprising:

first means for applying multi-pulse trains of a forward laser beam to the optical disc to record mark areas thereon, the multi-pulse trains corresponding to the mark areas respectively;

a photosensitive element receiving a reflected laser beam which results from reflection of the forward laser beam by the optical disc, the photosensitive element generating a current depending on an intensity of the reflected laser beam;

second means for converting the current generated by the photosensitive element into a voltage;

third means for detecting, on the basis of the voltage generated by the second means, a maximal intensity of the reflected laser beam which is caused by first one among pulses in each of the multi-pulse trains;

a low pass filter receiving the voltage generated by the second means for attenuating a component of the voltage which has a frequency equal to a frequency of the multi-pulse trains;

a sample-and-hold circuit for detecting, on the basis of an output signal from the low pass filter, a mean intensity of the reflected laser beam which corresponds to each of the multi-pulse trains;

fourth means for dividing one of (1) the detected mean intensity, (2) a difference between the detected mean intensity and a detected intensity of the reflected laser beam which corresponds to each of intervals between the multi-pulse trains, and (3) a ratio between the detected mean intensity and a detected intensity of the reflected laser beam which corresponds to each of intervals between the multi-pulse trains by the maximal intensity detected by the third means to generate a division result; and fifth means for detecting a condition of recording of each of the mark areas in response to the division result generated by the fourth means.

18. An apparatus for recording information on an optical disc, comprising:

first means for applying multi-pulse trains of a forward laser beam to the optical disc to record mark areas thereon, the multi-pulse trains corresponding to the mark areas respectively;

a photosensitive element receiving a reflected laser beam which results from reflection of the forward laser beam by the optical disc, the photosensitive element generating a current depending on an intensity of the reflected laser beam;

second means for converting the current generated by the photosensitive element into a voltage;

a first sample-and-hold circuit for detecting, on the basis of the voltage generated by the second means, an intensity of the reflected laser beam which corresponds to each of the multi-pulse trains;

a low pass filter receiving the voltage generated by the second means for attenuating a component of the voltage which has a frequency equal to a frequency of the multi-pulse trains;

a second sample-and-hold circuit for detecting, on the basis of an output signal from the low pass filter, a mean intensity of the reflected laser beam which corresponds to each of the multi-pulse trains;

third means for dividing one of (1) the detected mean intensity, (2) a difference between the detected mean intensity and a detected intensity of the reflected laser beam which corresponds to each of intervals between the multi-pulse trains, and (3) a ratio between the detected mean intensity and a detected intensity of the reflected laser beam which corresponds to each of intervals between the multi-pulse trains by the intensity detected by the first sample-and-hold circuit to generate a division result; and fourth means for detecting a condition of recording of each of the mark areas in response to the division result generated by the third means.

19. An apparatus for recording information on an optical disc, comprising:

first means for applying multi-pulse trains of a forward laser beam to the optical disc;

second means for detecting an intensity of a reflected laser beam which results from reflection of the forward laser beam by the optical disc;

third means for generating a mean of the intensity detected by the second means, the mean corresponding to each of the multi-pulse trains; and fourth means for controlling an amplitude of each of the multi-pulse trains in response to the mean generated by the third means.

20. An apparatus for recording information on an optical disc, comprising:

first means for applying multi-pulse trains of a forward laser beam to the optical disc;

second means for detecting an intensity of a reflected laser beam which results from reflection of the forward laser beam by the optical disc;

third means for generating a mean of the intensity detected by the second means, the mean corresponding to each of the multi-pulse trains;

fourth means for sampling the intensity detected by the second means to generate a first intensity sample corresponding to a maximal intensity of the reflected laser beam which is caused by first one among pulses in each of the multi-pulse trains;

fifth means for sampling the intensity detected by the second means to generate a second intensity sample representing an intensity of the reflected laser beam which corresponds to each of intervals between the multi-pulse trains; and sixth means for controlling an amplitude of each of the multi-pulse trains in response to the mean generated by the third means, the first intensity sample generated by the fourth means, and the second intensity sample generated by the fifth means.

* * * * *